United States Patent
Wu et al.

(10) Patent No.: US 10,834,541 B2
(45) Date of Patent: Nov. 10, 2020

(54) METHOD FOR SETTING MCPTT GROUP, DEVICE, AND SYSTEM

(71) Applicant: HUAWEI TECHNOLOGIES CO., LTD., Guangdong (CN)

(72) Inventors: Yizhuang Wu, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 15/940,365

(22) Filed: Mar. 29, 2018

(65) Prior Publication Data

US 2018/0220270 A1   Aug. 2, 2018

Related U.S. Application Data

(63) Continuation of application No. PCT/CN2015/091251, filed on Sep. 30, 2015.

(51) Int. Cl.
   *H04W 4/08* (2009.01)
   *H04W 4/10* (2009.01)

(52) U.S. Cl.
   CPC ............... *H04W 4/08* (2013.01); *H04W 4/10* (2013.01)

(58) Field of Classification Search
   CPC combination set(s) only.
   See application file for complete search history.

(56) References Cited

U.S. PATENT DOCUMENTS

| | | |
|---|---|---|
| 2003/0101085 A1 | 5/2003 | Butler, III et al. |
| 2007/0162588 A1 | 7/2007 | Wu et al. |
| 2016/0381528 A1* | 12/2016 | Lee .................. H04W 4/90 455/404.1 |

FOREIGN PATENT DOCUMENTS

| | | |
|---|---|---|
| CN | 1794834 A | 6/2006 |
| CN | 101459879 A | 6/2009 |
| CN | 101714170 A | 5/2010 |
| CN | 104602351 A | 5/2015 |
| CN | 104618349 A | 5/2015 |

OTHER PUBLICATIONS

3GPP TS 23.179 V0.2.0 (Jul. 2015).*
"3rd Generation Partnership Project; Technical Specification Group Services and System Aspects; Mission Critical Push to Talk (MCPTT) over LTE; Stage 1 (Release 13)," 3GPP TS 22.179, V13.2.0, Jun. 2015, 77 pgs.
(Continued)

*Primary Examiner* — Zhitong Chen
(74) *Attorney, Agent, or Firm* — Slater Matsil, LLP

(57) ABSTRACT

Embodiments of the present invention provide a method for setting an MCPTT group, a device, and a system. A first network device receives a group selection request, where the group selection request is used to instruct to set a first MCPTT group as a selected MCPTT group for a first MCPTT user; and the first network device sends, according to the group selection request, information about the first MCPTT group to first UE used by the first MCPTT user, so that the first network device can set the first MCPTT group as a selected MCPTT group for the first MCPTT user. In this way, a function of setting, by one MCPTT user or a network system, a selected MCPTT group for another MCPTT user is implemented.

20 Claims, 8 Drawing Sheets

(56) References Cited

OTHER PUBLICATIONS

"3$^{rd}$ Generation Partnership Project; Technical Specification Group Services and System Aspects; Functional architecture and information flows to support mission critical communication services; Stage 2 (Release 13)," 3GPP TS 23.179, V1.0.0, Sep. 2015, 118 pgs.
SA6, "Presentation of TS 23.179 Version 1.0.0: Functional architecture and information flows to support mission critical communication services; Stage 2 (Release 13)," 3GPP TSG SA Meeting #69, Agenda Item 13.51, Sep. 15-17, 2015, TD SP-150485, 2 pgs.
International Search Report dated Jun. 14, 2016, in corresponding International Patent Application No. PCT/CN2015/091251, 7 pgs.
Written Opinion of the International Search Authority dated Jun. 14, 2016 in corresponding International Patent Application No. PCT/CN2015/091251, 5 pgs.
International Search Report dated Jun. 14, 2016 in corresponding International Patent Application No. PCT/CN2015/091251.

\* cited by examiner

METHOD FOR SETTING MCPTT GROUP, DEVICE, AND SYSTEM

CROSS-REFERENCE TO RELATED APPLICATIONS

This application is a continuation of International Application No. PCT/CN2015/091251, filed on Sep. 30, 2015, the disclosure of which is hereby incorporated by reference in its entirety.

TECHNICAL FIELD

Embodiments of the present invention relate to communications technologies, and in particular, to a method for setting a mission-critical push-to-talk (MCPTT) group, a device, and a system.

BACKGROUND

A prerequisite for transmitting data by an MCPTT user to an MCPTT group is that the MCPTT user selects the MCPTT group (that is, the MCPTT group is set as a selected group for the MCPTT user).

In actual application, one MCPTT user (for example, an authorized advanced MCPTT user may be a dispatcher or an administrator) or a network system may require an MCPTT user to transmit data to an MCPTT group. For example, due to a service requirement, a particular MCPTT user expects at least one of other MCPTT users to transmit data to an MCPTT group or some MCPTT groups. Therefore, one MCPTT user or a network system is required to set a selected MCPTT group for another MCPTT user.

However, a function of setting, by one MCPTT user or a network system, a selected MCPTT group for another MCPTT user cannot be supported yet in the prior art.

SUMMARY

Embodiments of the present invention provide a method for setting an MCPTT group, a device, and a system, so as to resolve a problem in the prior art that a function of setting, by one MCPTT user or a network system, a selected MCPTT group for another MCPTT user cannot be supported.

According to a first aspect, an embodiment of the present invention provides a method for setting a mission-critical push-to-talk MCPTT group, including:

receiving, by a first network device, a group selection request, where the group selection request is used to instruct to set a first MCPTT group as a selected MCPTT group for a first MCPTT user; and sending, by the first network device according to the group selection request, information about the first MCPTT group to first user equipment UE used by the first MCPTT user.

With reference to the first aspect, in a first possible implementation of the first aspect, the group selection request includes first information, and the first information includes:

a user identifier of the first MCPTT user and a group identifier of the first MCPTT group; or a group identifier of a second MCPTT group to which the first MCPTT user belongs and a group identifier of the first MCPTT group; or a group identifier of the first MCPTT group.

With reference to the first possible implementation of the first aspect, in a second possible implementation of the first aspect, the first information is used to instruct to set the first MCPTT group as the selected MCPTT group for the first MCPTT user.

With reference to any one of the first aspect, or the first and the second possible implementations of the first aspect, in a third possible implementation of the first aspect, the information about the first MCPTT group includes the group identifier of the first MCPTT group.

With reference to any one of the first aspect, or the first to the third possible implementations of the first aspect, in a fourth possible implementation of the first aspect, the receiving, by a first network device, a group selection request includes:

receiving, by the first network device, the group selection request sent by a second network device; or receiving, by the first network device, the group selection request that is sent by second UE used by a second MCPTT user.

With reference to the fourth possible implementation of the first aspect, in a fifth possible implementation of the first aspect, the information about the first MCPTT group is carried in a group selection message.

With reference to the fifth possible implementation of the first aspect, in a sixth possible implementation of the first aspect, the group selection message further includes an identifier of the second MCPTT user.

With reference to the fifth or the sixth possible implementation of the first aspect, in a seventh possible implementation of the first aspect, before the sending, by the first network device according to the group selection request, information about the first MCPPT group to first user equipment UE used by the first MCPTT user, the method further includes:

determining, by the first network device, that the second MCPTT user has authority to set a selected MCPTT group for the first MCPTT user.

With reference to any one of the first aspect, or the first to the seventh possible implementations of the first aspect, in an eighth possible implementation of the first aspect, before the sending, by the first network device according to the group selection request, information about the first MCPPT group to first user equipment UE used by the first MCPTT user, the method further includes:

determining, by the first network device, that the first MCPTT group is available.

With reference to any one of the first aspect, or the first to the eighth possible implementations of the first aspect, in a ninth possible implementation of the first aspect, the sending, by the first network device according to the group selection request, information about the first MCPPT group to first user equipment UE used by the first MCPTT user includes:

if the first MCPTT user has been associated with the first MCPTT group, sending the group selection message to the first UE; or if the first MCPTT user is not associated with the first MCPTT group, associating, by the first network device, the first MCPTT user with the first MCPTT group, and sending the group selection message to the first UE.

With reference to any one of the first aspect, or the first to the ninth possible implementations of the first aspect, in a tenth possible implementation of the first aspect, the method further includes:

receiving, by the first network device, a group response message sent by the first UE, where the group response message is used to indicate that the first MCPTT user is authorized to set the first MCPTT group as a selected MCPTT group for the first MCPTT user; or receiving, by the first network device, a group selection indication message sent by the first UE, where the group selection indication message is used to indicate that the first UE successfully sets the first MCPTT group as a selected MCPTT group for the first MCPTT user.

With reference to the tenth possible implementation of the first aspect, in an eleventh possible implementation of the first aspect, the method further includes:

storing, by the first network device, indication information, where the indication information is used to indicate that the first MCPTT group is a selected MCPTT group for the first MCPTT user.

According to a second aspect, an embodiment of the present invention provides a method for setting a mission-critical push-to-talk MCPTT group, including:

receiving, by first user equipment UE, information about a first MCPTT group that is sent by a first network device, where the information about the first MCPTT group is used to indicate a selected MCPTT group for a first MCPTT user, and the first MCPTT user uses the first UE; and setting, by the first UE according to the information about the first MCPTT group, the first MCPTT group as a selected MCPTT group for the first MCPTT user.

With reference to the second aspect, in a first possible implementation of the second aspect, the information about the first MCPTT group is carried in a group selection message.

With reference to the first possible implementation of the second aspect, in a second possible implementation of the second aspect, the group selection message further includes an identifier of the second MCPTT user.

With reference to any one of the second aspect, or the first and the second possible implementations of the second aspect, in a third possible implementation of the second aspect, the setting, by the second UE according to the information about the first MCPTT group, the first MCPTT group as a selected MCPTT group for the second MCPTT user includes:

if the first MCPTT user is authorized to set the first MCPTT group as a selected MCPTT group for the first MCPTT user, setting, by the first UE, the first MCPTT group as the selected MCPTT group for the first MCPTT user.

With reference to any one of the second aspect, or the first to the third possible implementations of the second aspect, in a fourth possible implementation of the second aspect, after the setting, by the first UE, the first MCPTT group as a selected MCPTT group for the first MCPTT user, the method further includes:

sending, by the first UE, a group response message to the first network device, where the group response message is used to indicate that the first MCPTT user is authorized to set the first MCPTT group as a selected MCPTT group for the first MCPTT user; or sending, by the first UE, a group selection indication message to the first network device, where the group selection indication message is used to indicate that the first UE successfully sets the first MCPTT group as a selected MCPTT group for the first MCPTT user.

According to a third aspect, an embodiment of the present invention provides a network device, where the network device is a first network device, and the network device includes:

a receiving module, configured to receive a group selection request, where the group selection request is used to instruct to set a first MCPTT group as a selected MCPTT group for a first MCPTT user; and a sending module, configured to send, according to the group selection request, information about the first MCPTT group to first user equipment UE used by the first MCPTT user.

With reference to the third aspect, in a first possible implementation of the third aspect, the group selection request includes first information, and the first information includes:

a user identifier of the first MCPTT user and a group identifier of the first MCPTT group; or a group identifier of a second MCPTT group to which the first MCPTT user belongs and a group identifier of the first MCPTT group; or a group identifier of the first MCPTT group.

With reference to the first possible implementation of the third aspect, in a second possible implementation of the third aspect, the first information is used to instruct to set the first MCPTT group as the selected MCPTT group for the first MCPTT user.

With reference to any one of the third aspect, or the first and the second possible implementations of the third aspect, in a third possible implementation of the third aspect, the information about the first MCPTT group includes the group identifier of the first MCPTT group.

With reference to any one of the third aspect, or the first to the third possible implementations of the third aspect, in a fourth possible implementation of the third aspect, that the receiving module receives the group selection request specifically includes:

receiving the group selection request sent by a second network device; or receiving the group selection request that is sent by second UE used by a second MCPTT user.

With reference to the fourth possible implementation of the third aspect, in a fifth possible implementation of the third aspect, the information about the first MCPTT group is carried in a group selection message.

With reference to the fifth possible implementation of the third aspect, in a sixth possible implementation of the third aspect, the group selection message further includes an identifier of the second MCPTT user.

With reference to the fifth or the sixth possible implementation of the third aspect, in a seventh possible implementation of the third aspect, the network device further includes: a first processing module, configured to determine that the second MCPTT user has authority to set a selected MCPTT group for the first MCPTT user.

With reference to any one of the third aspect, or the first to the seventh possible implementations of the third aspect, in an eighth possible implementation of the third aspect, the network device further includes: a second processing module, configured to determine that the first MCPTT group is available.

With reference to any one of the third aspect, or the first to the eighth possible implementations of the third aspect, in a ninth possible implementation of the third aspect, that the sending module sends, according to the group selection request, the group selection message to the first user equipment UE used by the first MCPTT user specifically includes:

if the first MCPTT user has been associated with the first MCPTT group, sending the group selection message to the first UE; or if the first MCPTT user is not associated with the first MCPTT group, associating, by the first network device, the first MCPTT user with the first MCPTT group, and sending the group selection message to the first UE.

With reference to any one of the third aspect, or the first to the ninth possible implementations of the third aspect, in a tenth possible implementation of the third aspect, the receiving module is further configured to:

receive a group response message sent by the first UE, where the group response message is used to indicate that the first MCPTT user is authorized to set the first MCPTT group as a selected MCPTT group for the first MCPTT user; or receive a group selection indication message sent by the first UE, where the group selection indication message is used to indicate that the first UE successfully sets the first MCPTT group as a selected MCPTT group for the first MCPTT user.

With reference to the tenth possible implementation of the third aspect, in an eleventh possible implementation of the third aspect, the network device further includes: a third processing module, configured to store indication information, where the indication information is used to indicate that the first MCPTT group is a selected MCPTT group for the first MCPTT user.

According to a fourth aspect, an embodiment of the present invention provides user equipment UE, where the UE is first UE, and the UE includes:

a receiving module, configured to receive information about a first MCPTT group that is sent by a first network device, where the information about the first MCPTT group is used to indicate a selected MCPTT group for a first MCPTT user, and the first MCPTT user uses the first UE; and a processing module, configured to set, according to the information about the first MCPTT group, the first MCPTT group as a selected MCPTT group for the first MCPTT user.

With reference to the fourth aspect, in a first possible implementation of the fourth aspect, the information about the first MCPTT group is carried in a group selection message.

With reference to the first possible implementation of the fourth aspect, in a second possible implementation of the fourth aspect, the group selection message further includes an identifier of the second MCPTT user.

With reference to any one of the fourth aspect, or the first and the second possible implementations of the fourth aspect, in a third possible implementation of the fourth aspect, the processing module is specifically configured to:

if the first MCPTT user is authorized to set the first MCPTT group as a selected MCPTT group for the first MCPTT user, set, by the first UE, the first MCPTT group as the selected MCPTT group for the first MCPTT user.

With reference to any one of the fourth aspect, or the first to the third possible implementations of the fourth aspect, in a fourth possible implementation of the fourth aspect, the UE further includes a sending module, and the sending module is configured to:

send a group response message to the first network device, where the group response message is used to indicate that the first MCPTT user is authorized to set the first MCPTT group as a selected MCPTT group for the first MCPTT user; or send a group selection indication message to the first network device, where the group selection indication message is used to indicate that the first UE sets the first MCPTT group as a selected MCPTT group for the first MCPTT user.

According to a fifth aspect, an embodiment of the present invention provides a system, including: the first network device according to any one of the third aspect, or the first to the eleventh possible implementations of the third aspect and the first user equipment UE according to any one of the fourth aspect, or the first to the fourth possible implementations of the fourth aspect.

The present invention provides a method for setting an MCPTT group, a device, and a system. A first network device receives a group selection request, where the group selection request is used to instruct to set a first MCPTT group as a selected MCPTT group for a first MCPTT user; and the first network device sends, according to the group selection request, information about the first MCPTT group to first UE used by the first MCPTT user, so that the first network device can set the first MCPTT group as a selected MCPTT group for the first MCPTT user. In this way, a function of setting, by one MCPTT user or a network system, a selected MCPTT group for another MCPTT user is implemented.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
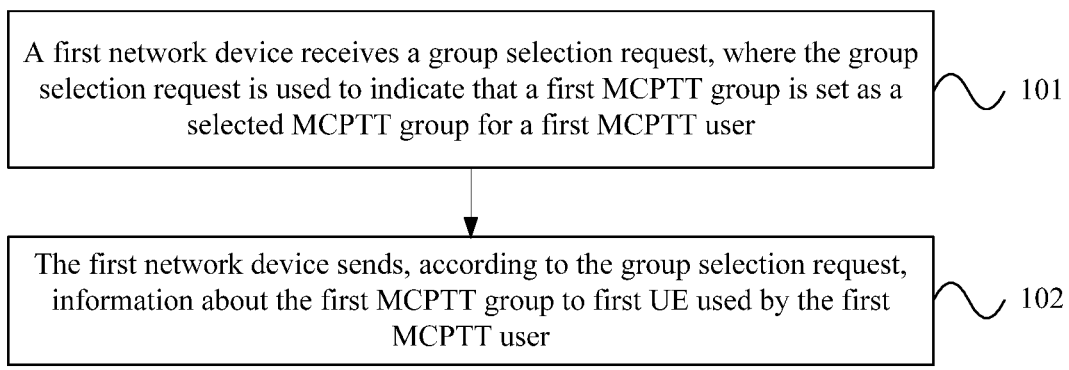
FIG. 1 is a flowchart of Embodiment 1 of a method for setting an MCPTT group according to the present invention.

FIG. 1 is a flowchart of Embodiment 1 of a method for setting an MCPTT group according to the present invention. As shown in FIG. 1, the method in this embodiment may include the following steps.

Step 101: A first network device receives a group selection request, where the group selection request is used to instruct to set a first MCPTT group as a selected MCPTT group for a first MCPTT user.

It should be noted that a network device in the present invention (for example, a first network device or a second network device) may be a core device for public services or an MCPTT server in an MCPTT system. The core device for public services may be a configuration management server, a group management server, or a server that has a function similar to a user configuration data management function.

It should be noted that in the present invention, the MCPTT server is a network device configured to implement a group session or user registration, a configuration management server (GMS) is a network device adapted to configure MCPTT client data, and a group management server (GMS) is a network device configured to manage a group policy and maintain group information.

Step 102: The first network device sends, according to the group selection request, information about the first MCPTT group to first UE used by the first MCPTT user.

Optionally, when the first MCPTT user logs in, the first MCPTT user may register a correspondence between the first MCPTT user and the first MCPTT group on a network side. When sending the information about the first MCPTT group to the UE used by the first MCPTT user, the first network device may send the information about the first MCPTT group to the first UE by using the correspondence.

In this embodiment, the first network device receives the group selection request, where the group selection request is used to instruct to set the first MCPTT group as the selected MCPTT group for the first MCPTT user; and the first network device sends, according to the group selection request, the information about the first MCPTT group to the first user equipment UE used by the first MCPTT user, so that the first network device can set the first MCPTT group as a selected MCPTT group for the first MCPTT user. In this way, a function of setting, by one MCPTT user or a network system, a selected MCPTT group for another MCPTT user is implemented.

Figure 2:
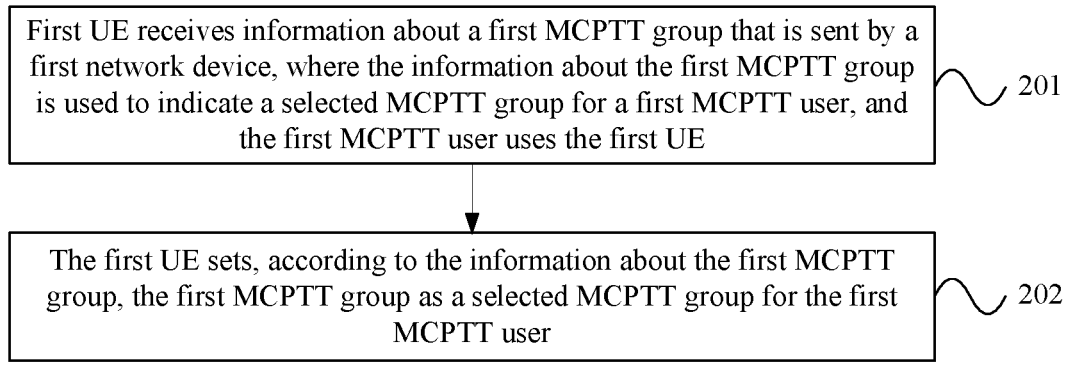
FIG. 2 is a flowchart of Embodiment 2 of a method for setting an MCPTT group according to the present invention.

FIG. 2 is a flowchart of Embodiment 2 of a method for setting an MCPTT group according to the present invention. As shown in FIG. 2, the method in this embodiment may include the following steps.

Step 201: First UE receives information about a first MCPTT group that is sent by a first network device, where the information about the first MCPTT group is used to indicate a selected MCPTT group for a first MCPTT user, and the first MCPTT user uses the first UE.

Step 202: The first UE sets, according to the information about the first MCPTT group, the first MCPTT group as a selected MCPTT group for the first MCPTT user.

In this embodiment, the first UE receives the information about the first MCPTT group that is sent by the first network device, where the information about the first MCPTT group is used to indicate a selected MCPTT group for the first MCPTT user, and the first MCPTT user uses the first UE; and the first UE sets, according to the information about the first MCPTT group, the first MCPTT group as the selected MCPTT group for the first MCPTT user, so that the first UE can set, according to the information sent by the first network device, the first MCPTT group as the selected MCPTT group for the first MCPTT user. In this way, a function of setting, by one MCPTT user or a network system, a selected MCPTT group for another MCPTT user is implemented.

Figure 3:
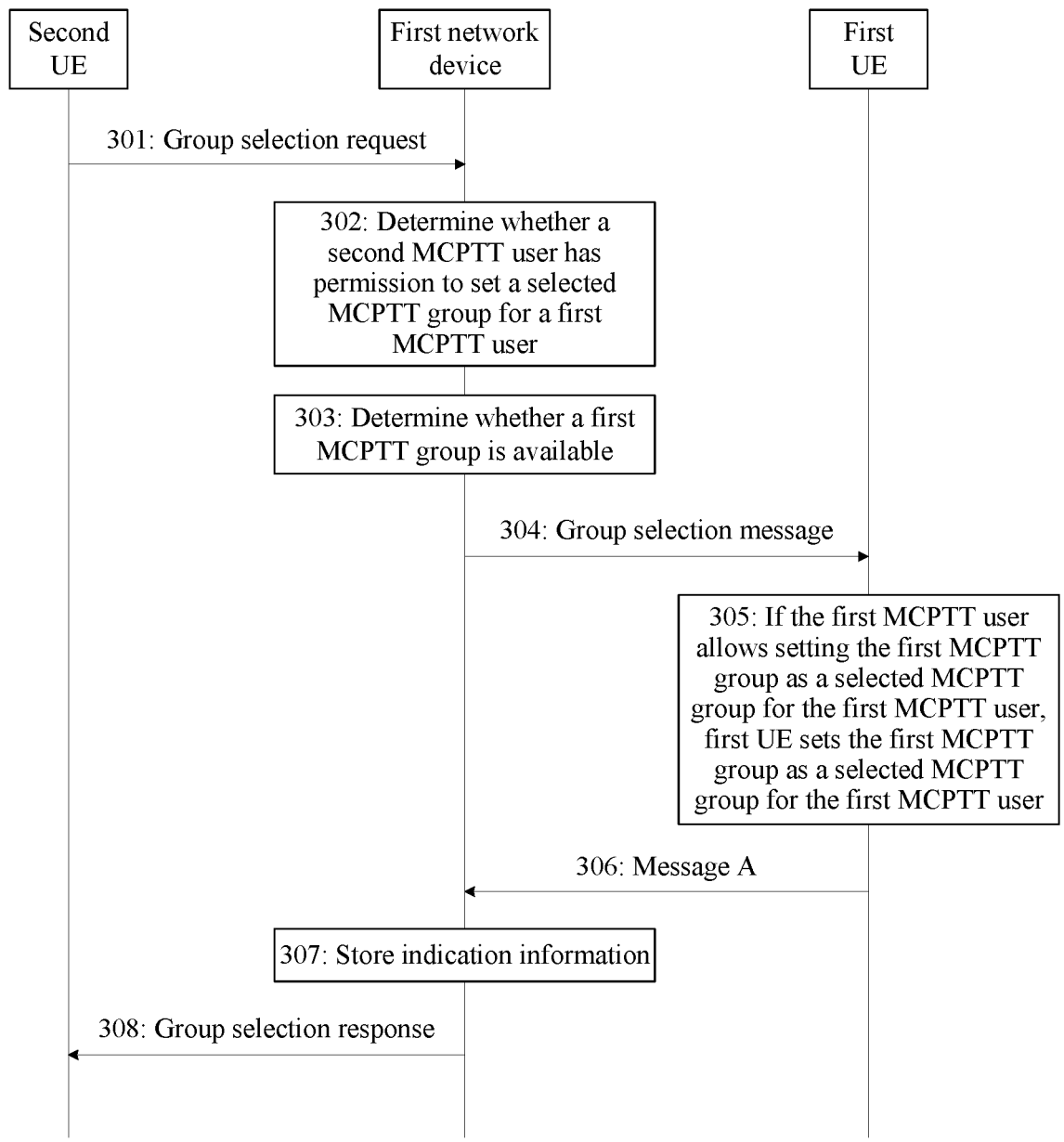
FIG. 3 is a flowchart of Embodiment 3 of a method for setting an MCPTT group according to the present invention.

FIG. 3 is a flowchart of Embodiment 3 of a method for setting an MCPTT group according to the present invention. As shown in FIG. 3, the method in this embodiment may include the following steps.

Step 301: Second UE sends a group selection request to a first network device.

The group selection request is used to instruct to set a first MCPTT group as a selected MCPTT group for a first MCPTT user, and the second MCPTT user is an MCPTT user that uses the second UE.

Optionally, the group selection request includes first information, and the first information includes: a user identifier of the first MCPTT user and a group identifier of the first MCPTT group; or a group identifier of a second MCPTT group to which the first MCPTT user belongs and a group identifier of the first MCPTT group; or a group identifier of the first MCPTT group.

It should be noted that when the first information includes the group identifier of the second MCPTT group to which the first MCPTT user belongs, the first information may be used to instruct to set the first MCPTT group as the selected MCPTT group for all MCPTT users belonging to the second MCPTT group.

When the first information includes the group identifier of the first MCPTT group, the first information may be used to instruct to set the first MCPTT group as the selected MCPTT group for all MCPTT users belonging to the first MCPTT group.

Optionally, the first information is used to instruct to set the first MCPTT group as the selected MCPTT group for the first MCPTT user.

It should be noted that the group selection request in step 301 may further include second information, and the second information includes: a user identifier of the MCPTT user A and a group identifier of an MCPTT group A; or a group identifier of an MCPTT group B to which an MCPTT user A belongs and a group identifier of an MCPTT group A; or a group identifier of an MCPTT group A.

Optionally, the second information is used to indicate that the MCPTT group A is set as a selected MCPTT group for the MCPTT user A.

Optionally, before step 301, the method may further include:

The second UE determines, according to input of the second MCPTT user, that the second MCPTT user sets the first MCPTT group as a selected MCPTT group for the first MCPTT user.

Step 302: The first network device determines whether the second MCPTT user has authority to set a selected MCPTT group for the first MCPTT user.

If the second MCPTT user has authority to set a selected MCPTT group for the first MCPTT user, step 303 is performed; otherwise, the procedure ends, or the first network device sends, to the second UE, a group selection response that is used to indicate a setting failure.

Optionally, a condition that an MCPTT user that can set a selected MCPTT group for the first MCPTT user needs to meet may be pre-stored in the first network device. For example, which roles the MCPTT user needs to undertake, and a user priority of the MCPTT user needs to be higher than or equal to a preset priority.

Step 303: The first network device determines whether the first MCPTT group is available.

If the first MCPTT group is available, step 304 is performed; otherwise, the procedure ends, or the first network device sends, to the second UE, a group selection response that is used to indicate a setting failure.

Optionally, when information about the first MCPTT group does not exist or the first MCPTT group is deregistered, the first network device may determine that the first MCPTT group is unavailable.

It should be noted that step 302 and step 303 are optional steps, and a sequence of operations executed in step 302 and step 303 is not limited.

Step 304: The first network device sends a group selection message to first UE, where information about the first MCPTT group is carried in the group selection message.

Optionally, the information about the first MCPTT group includes the group identifier of the first MCPTT group.

Optionally, the group selection message may further include an identifier of the second MCPTT user, so that the first MCPTT user may determine that the second MCPTT user sets a selected MCPTT group for the first MCPTT user.

Optionally, before step 304, the method may further include: The first network device determines, by exchanging with another network device, that the first MCPTT user has been associated with the first MCPTT group.

Alternatively, optionally, step 304 may specifically be: If the first MCPTT user has been associated with the first MCPTT group, the first network device sends a group selection message to the first UE; or if the first MCPTT user is not associated with the first MCPTT group, the first network device associates the first MCPTT user with the first MCPTT group and sends a group selection message to the first UE.

Optionally, that the first network device associates the first MCPTT user with the first MCPTT group includes: When an MCPTT system that defines the first MCPTT group is the same as an MCPTT system to which the first network device belongs, the first network device associates the second MCPTT user with an operation of the first MCPTT group; or when an MCPTT system that defines the first MCPTT group is different from an MCPTT system to which the first network device belongs, the first network device may send a message to a network device (for example, an MCPTT server or a group management server) in the MCPTT system that defines the first MCPTT group, so that the network device in the MCPTT system that defines the first MCPTT group associates the second MCPTT user with the first MCPTT group.

Step 305: If the first MCPTT user is authorized to set the first MCPTT group as a selected MCPTT group for the first MCPTT user, the first UE sets the first MCPTT group as a selected MCPTT group for the first MCPTT user.

Optionally, before step 305, the method may further include: The first UE informs whether the first MCPTT user is authorized to set the first MCPTT group as a selected MCPTT group for the first MCPTT user; or the first UE determines, according to input of the first MCPTT user, whether the first MCPTT user is authorized to set the first MCPTT group as a selected group for the first MCPTT user.

For example, the first UE displays a dialog box on a display interface of the first UE. In the dialog box, for example, a text "Whether to set the first MCPTT group as a selected MCPTT group for the first MCPTT" and options "Yes" and "No" may be displayed. When the first MCPTT user chooses "Yes", it is determined that the first MCPTT user is authorized to set the first MCPTT group as a selected MCPTT group for the first MCPTT user.

Optionally, that the first UE sets the first MCPTT group as a selected MCPTT group for the first MCPTT user may include: The first UE stores local information used to indicate that the first MCPTT group is a selected MCPTT group for the first MCPTT user; or the first UE updates local information, where updated local information indicates that the first MCPTT group is a selected MCPTT group for the first MCPTT user.

Step 306: The first UE sends a message A to the first network device.

Optionally, the message A may be a group response message or a group selection indication message.

The group response message may be considered as a response message for the group selection message, and is used to indicate that the first MCPTT user is authorized to set the first MCPTT group as a selected MCPTT group for the first MCPTT user. The group selection indication message may be considered as a message that is triggered by the group selection message and that is sent by the first UE, and is used to indicate that the first UE successfully sets the first MCPTT group as a selected MCPTT group for the first MCPTT user.

Step 307: The first network device stores indication information, where the indication information is used to indicate that the first MCPTT group is a selected MCPTT group for the first MCPTT user.

It should be noted that step 307 is an optional step, and information about the selected MCPTT group for the first MCPTT user may be obtained from the first network device by performing step 307.

Step 308: The first network device sends, to the second UE, a group selection response that is used to indicate a setting success.

It should be noted that step 308 is an optional step.

It should be noted that a sequence of performing step 308 and step 307 is not limited.

In this embodiment, the second UE sends the group selection request to the first network device; and the first network device sends the information about the first MCPTT group to the first UE according to the group selection request. If the first MCPTT user is authorized to set the first MCPTT group as a selected MCPTT group for the first MCPTT user, the first UE sets the first MCPTT group as the selected MCPTT group for the first MCPTT user. In this way, a function of setting, by one MCPTT user or a network system, a selected MCPTT group for another MCPTT user is implemented.

Figure 4:
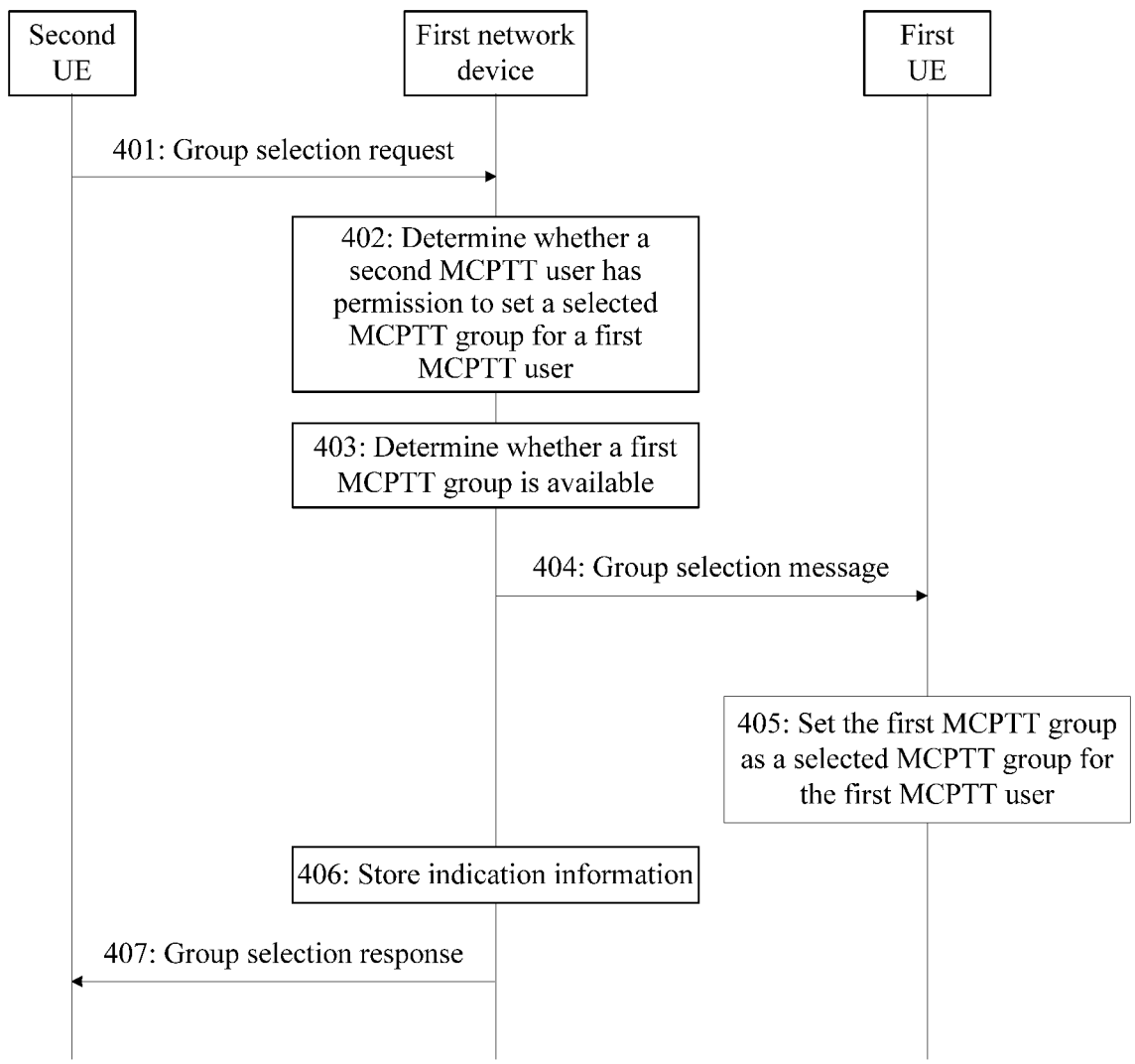
FIG. 4 is a flowchart of Embodiment 4 of a method for setting an MCPTT group according to the present invention.

FIG. 4 is a flowchart of Embodiment 4 of a method for setting an MCPTT group according to the present invention. As shown in FIG. 4, the method in this embodiment may include the following steps.

Step 401: Second UE sends a group selection request to a first network device.

The group selection request is used to instruct to set a first MCPTT group as a selected MCPTT group for a first MCPTT user, and the second MCPTT user is an MCPTT user that uses the second UE.

It should be noted that step 401 is similar to step 301. Details are not further described herein.

Step 402: The first network device determines whether the second MCPTT user has authority to set a selected MCPTT group for the first MCPTT user.

If the second MCPTT user has authority to set a selected MCPTT group for the first MCPTT user, step 403 is performed; otherwise, the procedure ends, or the first network device sends, to the second UE, a group selection response that is used to indicate a setting failure.

It should be noted that step 402 is similar to step 302. Details are not further described herein.

Step 403: The first network device determines whether the first MCPTT group is available.

If the first MCPTT group is available, step 404 is performed; otherwise, the procedure ends, or the first network device sends, to the second UE, a group selection response that is used to indicate a setting failure.

It should be noted that step 403 is similar to step 303. Details are not further described herein.

It should be noted that step 402 and step 403 are optional steps, and a sequence of operations executed in step 402 and step 403 is not limited.

Step 404: The first network device sends a group selection message to first UE, where information about the first MCPTT group is carried in the group selection message.

It should be noted that step 404 is similar to step 304. Details are not further described herein.

Step 405: The first UE sets the first MCPTT group as a selected MCPTT group for the first MCPTT user.

Optionally, that the first UE sets the first MCPTT group as a selected MCPTT group for the first MCPTT user may include: The first UE stores local information used to indicate that the first MCPTT group is a selected MCPTT group for the first MCPTT user; or the first UE updates local information, where updated local information indicates that the first MCPTT group is a selected MCPTT group for the first MCPTT user.

Step 406: The first network device stores indication information, where the indication information is used to indicate that the first MCPTT group is a selected MCPTT group for the first MCPTT user.

It should be noted that step 406 is an optional step.

Step 407: The first network device sends, to the second UE, a group selection response that is used to indicate a setting success.

It should be noted that a sequence of performing step 404, step 406, and step 407 is not limited.

In this embodiment, the second UE sends the group selection request to the first network device; the first network device sends the information about the first MCPTT group to the first UE according to the group selection request; and the first UE sets the first MCPTT group as the selected MCPTT group for the first MCPTT user. In this way, a function of setting, by one MCPTT user or a network system, a selected MCPTT group for another MCPTT user is implemented.

It should be noted that a major difference between the embodiment shown in FIG. 4 and the embodiment shown in FIG. 3 is as follows. In the embodiment shown in FIG. 3, after receiving the information about the first MCPTT group that is sent by the first network device, the first UE determines to set the first MCPTT group as a selected MCPTT group for the first MCPTT user if the first MCPTT user is authorized to set the first MCPTT group as a selected MCPTT group for the first MCPTT user. In the embodiment shown in FIG. 4, after receiving the information about the first MCPTT group that is sent by the first network device, the first UE directly sets the first MCPTT group as a selected MCPTT group for the first MCPTT user. That is, the embodiment shown in FIG. 3 provides a negotiation manner, while the embodiment shown in FIG. 4 provides a mandatory manner.

Figure 5:
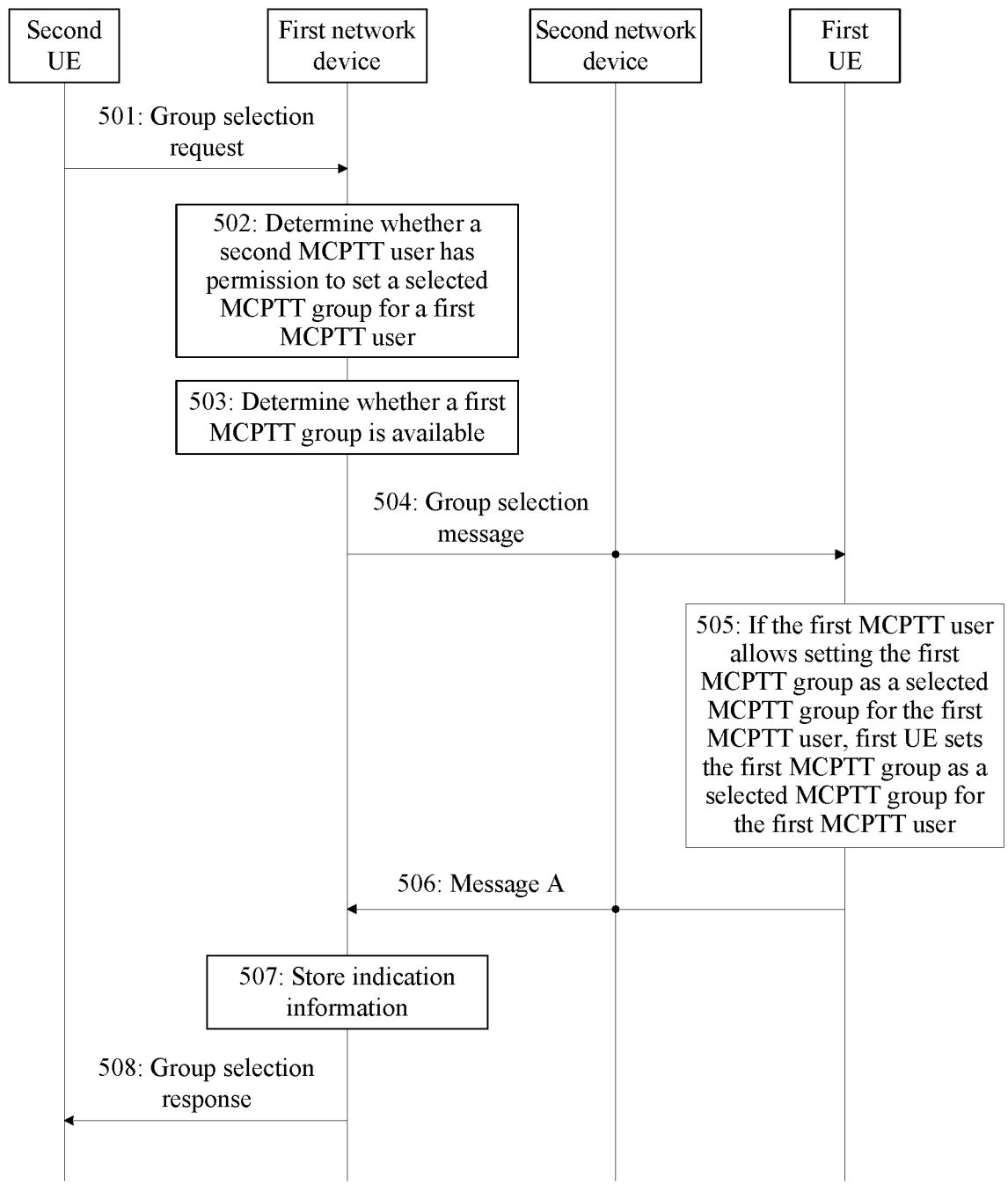
FIG. 5 is a flowchart of Embodiment 5 of a method for setting an MCPTT group according to the present invention.

FIG. 5 is a flowchart of Embodiment 5 of a method for setting an MCPTT group according to the present invention. As shown in FIG. 5, the method in this embodiment may include the following steps.

Step 501: Second UE sends a group selection request to a first network device.

The group selection request is used to instruct to set a first MCPTT group as a selected MCPTT group for a first MCPTT user, and the second MCPTT user is an MCPTT user that uses the second UE.

It should be noted that step 501 is similar to step 301. Details are not further described herein.

Step 502: The first network device determines whether the second MCPTT user has authority to set a selected MCPTT group for the first MCPTT user.

If the second MCPTT user has authority to set a selected MCPTT group for the first MCPTT user, step 503 is performed; otherwise, the procedure ends, or the first network device sends, to the second UE, a group selection response that is used to indicate a setting failure.

It should be noted that step 502 is similar to step 302. Details are not further described herein.

Step 503: The first network device determines whether the first MCPTT group is available.

If the first MCPTT group is available, step 504 is performed; otherwise, the procedure ends, or the first network device sends, to the second UE, a group selection response that is used to indicate a setting failure.

It should be noted that step 503 is similar to step 303. Details are not further described herein.

It should be noted that step 502 and step 503 are optional steps, and a sequence of operations executed in step 502 and step 503 is not limited.

Step 504: The first network device sends a group selection message to first UE by using a second network device, where information about the first MCPTT group is carried in the group selection message.

Optionally, step 504 may specifically be: The first network device sends a message A to the second network device, where the message A is used for the second network device to send the group selection message to the first UE.

Step 505: If the first MCPTT user is authorized to set the first MCPTT group as a selected MCPTT group for the first MCPTT user, the first UE sets a first MCPTT group as a selected MCPTT group for the first MCPTT user.

It should be noted that step 505 is similar to step 305. Details are not further described herein.

Step 506: The first UE sends a message A to the first network device by using the second network device.

Optionally, step 506 may specifically be: The first UE sends a message b to the second network device, where the message b is used for the second network device to send the message A to the first network device.

Optionally, the message A may be a group response message or a group selection indication message.

The group response message may be considered as a response message for the group selection message, and is used to indicate that the first MCPTT user is authorized to set the first MCPTT group as a selected MCPTT group for the first MCPTT user. The group selection indication message may be considered as a message that is triggered by the group selection message and that is sent by the first UE, and is used to indicate that the first UE successfully sets the first MCPTT group as a selected MCPTT group for the first MCPTT user.

Optionally, the method in this embodiment may further include: The second network device stores indication information, where the indication information is used to indicate that the first MCPTT group is a selected MCPTT group for the first MCPTT user.

Step 507: The first network device stores indication information, where the indication information is used to indicate that the first MCPTT group is a selected MCPTT group for the first MCPTT user.

It should be noted that step 507 is an optional step.

Step 508: The first network device sends, to the second UE, a group selection response that is used to indicate a setting success.

It should be noted that a sequence of performing step 507 and step 508 is not limited.

In this embodiment, the second UE sends the group selection request to the first network device; and the first network device sends the information about the first MCPTT group to the first UE according to the group selection request by using the second network device. If the first MCPTT user is authorized to set the first MCPTT group as a selected MCPTT group for the first MCPTT user, the first UE sets the first MCPTT group as the selected MCPTT group for the first MCPTT user. In this way, a function of setting, by one MCPTT user or a network system, a selected MCPTT group for another MCPTT user is implemented.

Optionally, the first network device in FIG. 5 may be an MCPTT server, and the second network device may be a configuration management server (or a group management server, or the like). Alternatively, the first network device in FIG. 5 may be a configuration management server (or a group management server, or the like), and the second network device may be an MCPTT server.

Figure 6:
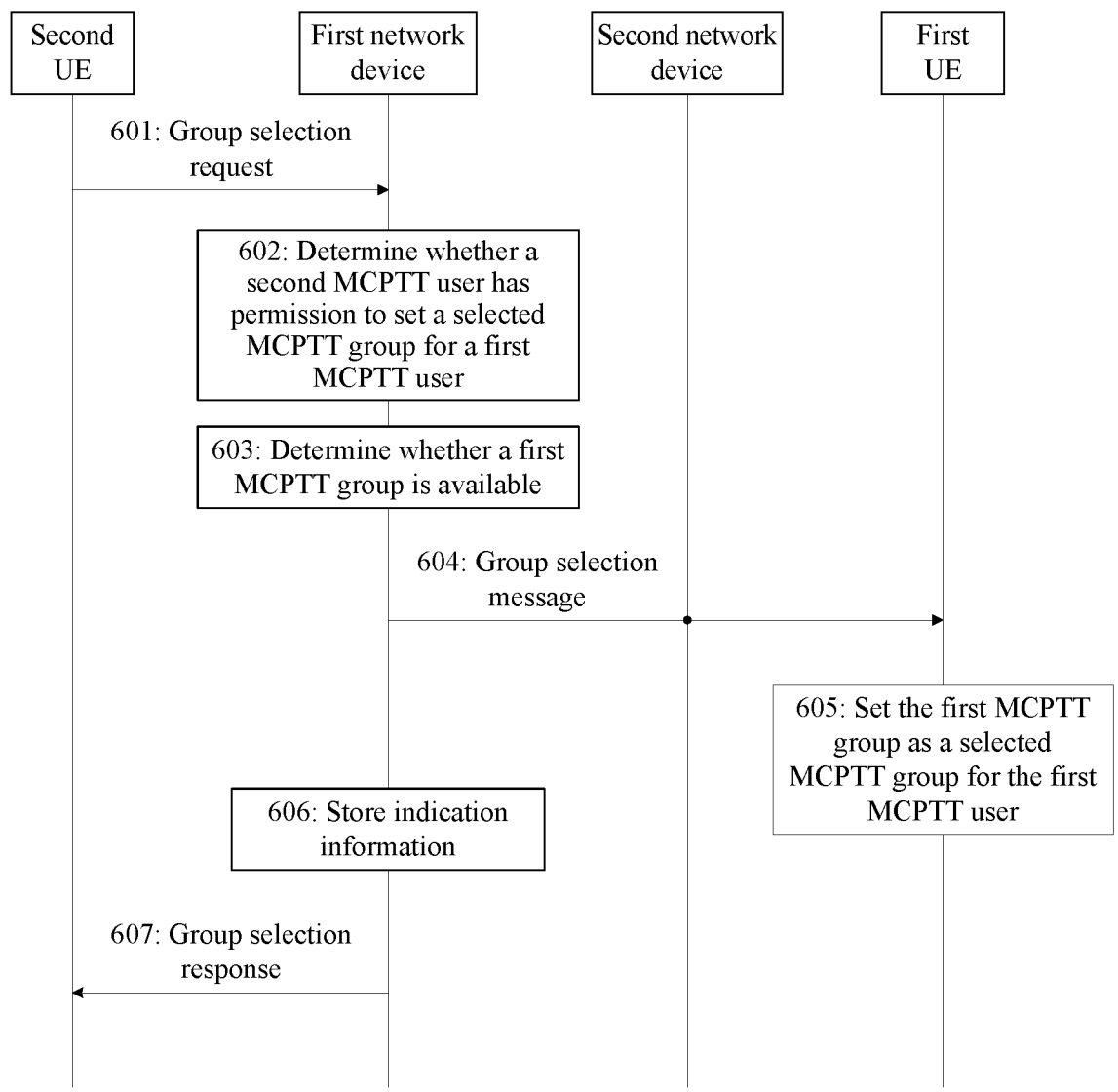
FIG. 6 is a flowchart of Embodiment 6 of a method for setting an MCPTT group according to the present invention.

FIG. 6 is a flowchart of Embodiment 6 of a method for setting an MCPTT group according to the present invention. As shown in FIG. 6, the method in this embodiment may include the following steps.

Step 601: Second UE sends a group selection request to a first network device.

The group selection request is used to instruct to set a first MCPTT group as a selected MCPTT group for a first MCPTT user, and the second MCPTT user is an MCPTT user that uses the second UE.

It should be noted that step 601 is similar to step 301. Details are not further described herein.

Step 602: The first network device determines whether the second MCPTT user has authority to set a selected MCPTT group for the first MCPTT user.

If the second MCPTT user has authority to set a selected MCPTT group for the first MCPTT user, step 603 is performed; otherwise, the procedure ends, or the first network device sends, to the second UE, a group selection response that is used to indicate a setting failure.

It should be noted that step 602 is similar to step 302. Details are not further described herein.

Step 603: The first network device determines whether the first MCPTT group is available.

If the first MCPTT group is available, step 604 is performed; otherwise, the procedure ends, or the first network device sends, to the second UE, a group selection response that is used to indicate a setting failure.

It should be noted that step 603 is similar to step 303. Details are not further described herein.

It should be noted that step 602 and step 603 are optional steps, and a sequence of operations executed in step 602 and step 603 is not limited.

Step 604: The first network device sends a group selection message to first UE by using a second network device, where information about the first MCPTT group is carried in the group selection message.

It should be noted that step 604 is similar to step 504. Details are not further described herein.

Optionally, the method in this embodiment may further include: The second network device stores indication information, where the indication information is used to indicate that the first MCPTT group is a selected MCPTT group for the first MCPTT user.

Step 605: The first UE sets the first MCPTT group as a selected MCPTT group for the first MCPTT user.

It should be noted that step 605 is similar to step 405. Details are not further described herein.

Step 606: The first network device stores indication information, where the indication information is used to indicate that the first MCPTT group is a selected MCPTT group for the first MCPTT user.

It should be noted that step 606 is an optional step.

Step 607: The first network device sends, to the second UE, a group selection response that is used to indicate a setting success.

It should be noted that a sequence of performing step 604, step 606, and step 607 is not limited.

In this embodiment, the second UE sends the group selection request to the first network device; the first network device sends the information about the first MCPTT group to the first UE according to the group selection request by using the second network device; and the first UE sets the first MCPTT group as the selected MCPTT group for the first MCPTT user. In this way, a function of setting, by one MCPTT user or a network system, a selected MCPTT group for another MCPTT user is implemented.

It should be noted that a major difference between the embodiment shown in FIG. 6 and the embodiment shown in FIG. 5 is as follows. In the embodiment shown in FIG. 5, after receiving the information about the first MCPTT group that is sent by the first network device, the first UE determines to set the first MCPTT group as a selected MCPTT group for the first MCPTT user if the first MCPTT user is authorized to set the first MCPTT group as a selected MCPTT group for the first MCPTT user. In the embodiment shown in FIG. 6, after receiving the information about the first MCPTT group that is sent by the first network device, the first UE directly sets the first MCPTT group as a selected MCPTT group for the first MCPTT user. That is, the embodiment shown in FIG. 5 provides a negotiation manner, while the embodiment shown in FIG. 6 provides a mandatory manner.

Optionally, the first network device in FIG. 6 may be an MCPTT server, and the second network device may be a configuration management server (or a group management server, or the like). Alternatively, the first network device in FIG. 6 may be a configuration management server (or a group management server, or the like), and the second network device may be an MCPTT server.

Figure 7:
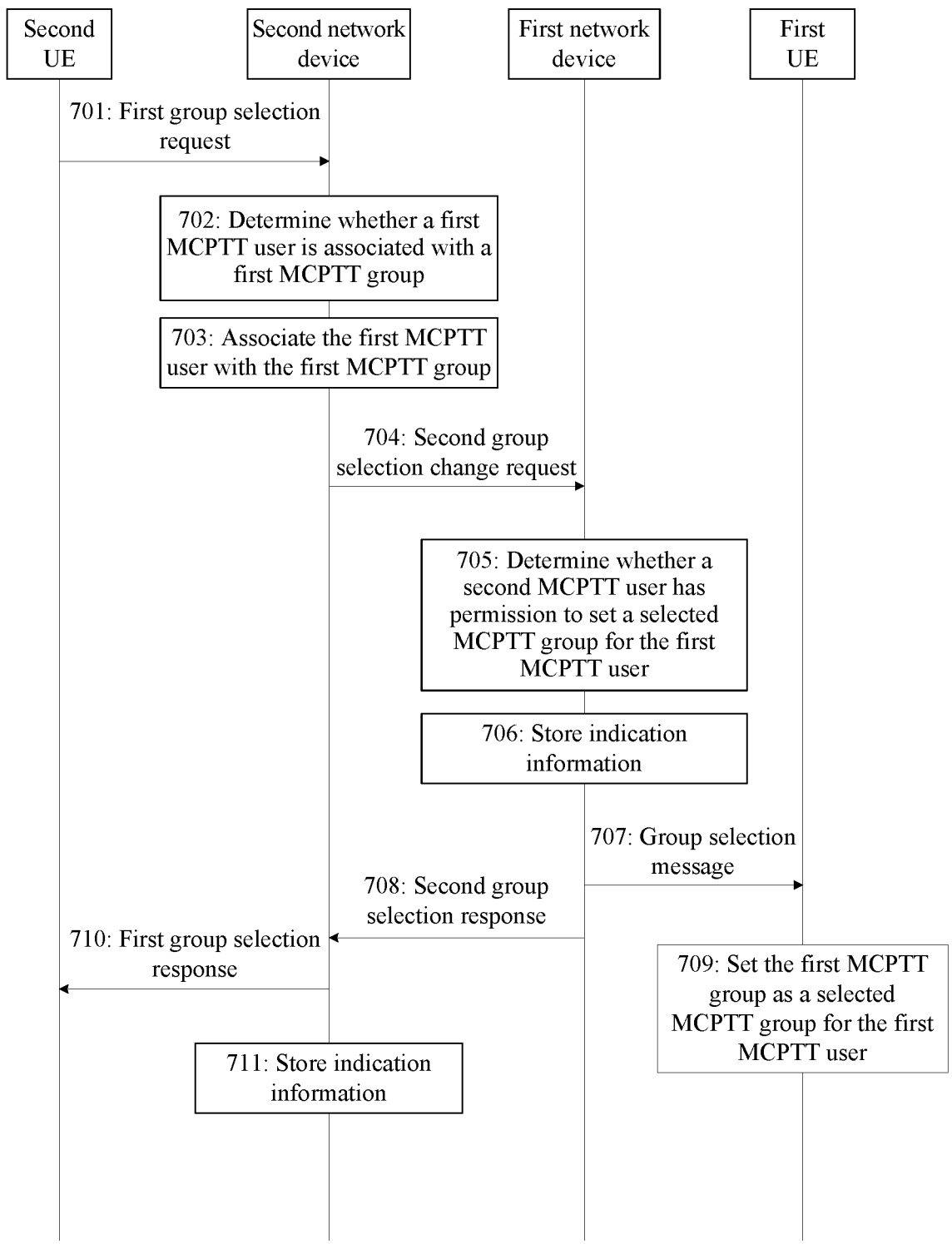
FIG. 7 is a flowchart of Embodiment 7 of a method for setting an MCPTT group according to the present invention.

FIG. 7 is a flowchart of Embodiment 7 of a method for setting an MCPTT group according to the present invention. As shown in FIG. 7, the method in this embodiment may include the following steps.

Step 701: Second UE sends a first group selection request to a second network device.

The first group selection request is used to instruct to set a first MCPTT group as a selected MCPTT group for a first MCPTT user, and the second MCPTT user is an MCPTT user that uses the second UE.

It should be noted that step 701 is similar to step 301. Details are not further described herein.

Step 702: The second network device determines whether the first MCPTT user is associated with the first MCPTT group.

If the first MCPTT user is associated with the first MCPTT group, step 704 is performed; otherwise, step 703 is performed.

It should be noted that step 702 is an optional step.

Step 703: The second network device associates the first MCPTT user with the first MCPTT group.

It should be noted that step 704 is performed after step 703.

Step 704: The second network device sends a second group selection request to a first network device according to the first group selection request.

The second group selection request is used to instruct to set the first MCPTT group as the selected MCPTT group for the first MCPTT user.

Step 705: The first network device determines whether the second MCPTT user has authority to set a selected MCPTT group for the first MCPTT user.

If the second MCPTT user has authority to set a selected MCPTT group for the first MCPTT user, step 706 is performed; otherwise, the procedure ends, or the first network device sends, to the second UE by using the second network device, a group selection response that is used to indicate a setting failure.

It should be noted that step 705 is similar to step 302. Details are not further described herein.

Step 706: The first network device stores indication information, where the indication information is used to indicate that the first MCPTT group is a selected MCPTT group for the first MCPTT user.

Step 707: The first network device sends a group selection message to first UE according to the second group selection request, where information about the first MCPTT group is carried in the group selection message.

Step 708: The first network device sends, to the second network device, a second group selection response that is used to indicate a setting success.

The second group selection response may be considered as a response message for the second group selection request.

It should be noted that a sequence of performing step 706, step 707, and step 708 is not limited.

Step 709: The first UE sets the first MCPTT group as a selected MCPTT group for the first MCPTT user.

It should be noted that step 709 is similar to step 405. Details are not further described herein.

Step 710: The second network device sends, to the second UE according to the second group selection response, a first group selection response that is used to indicate a setting success.

The first group selection response may be considered as a response message for the first group selection request.

Step 711: The second network device stores indication information, where the indication information is used to indicate that the first MCPTT group is a selected MCPTT group for the first MCPTT user.

It should be noted that step 711 is an optional step, and a sequence of performing step 711 and step 710 is not limited.

In this embodiment, the second UE sends the first group selection request to the second network device; the second network device sends the second group selection request to the first network device after determining that the first MCPTT user is associated with the first MCPTT group; the first network device sends the group selection message to the first UE after determining that the second MCPTT user has authority to set a selected MCPTT group for the first MCPTT user, where the information about the first MCPTT group is carried in the group selection message; and the first UE sets, according to the group selection message, the first MCPTT group as the selected MCPTT group for the first MCPTT user. In this way, a function of setting, by one MCPTT user or a network system, a selected MCPTT group for another MCPTT user is implemented.

It should be noted that a major difference between the embodiment shown in FIG. 7 and the embodiment shown in FIG. 4 is as follows. In the embodiment shown in FIG. 4, the first network device receives the group selection request sent by the second UE; in the embodiment shown in FIG. 7, the first network device receives the group selection request sent by the second network device.

It should be noted that the difference between the embodiment shown in FIG. 7 and the embodiment shown in FIG. 4 may be further applied to the embodiment shown in FIG. 3, so as to form a new technical solution.

Figure 8:
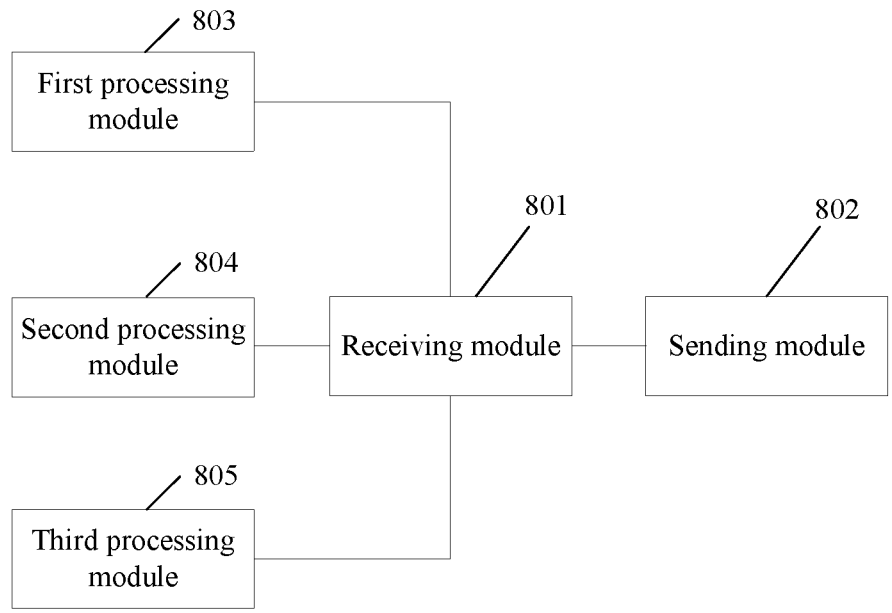
FIG. 8 is a schematic structural diagram of Embodiment 1 of a network device according to the present invention.

FIG. 8 is a schematic structural diagram of Embodiment 1 of a network device according to the present invention. The network device is a first network device. As shown in FIG. 8, the network device in this embodiment may include a receiving module 801 and a sending module 802. The receiving module 801 is configured to receive a group selection request, where the group selection request is used to instruct to set a first MCPTT group as a selected MCPTT group for a first MCPTT user. The sending module 802 is configured to send, according to the group selection request, information about the first MCPTT group to first user equipment UE used by the first MCPTT user.

Optionally, the group selection request includes first information, and the first information includes: a user identifier of the first MCPTT user and a group identifier of the first MCPTT group; or a group identifier of a second MCPTT group to which the first MCPTT user belongs and a group identifier of the first MCPTT group; or a group identifier of the first MCPTT group.

Optionally, the first information is used to instruct to set the first MCPTT group as the selected MCPTT group for the first MCPTT user.

Optionally, the information about the first MCPTT group includes a group identifier of the first MCPTT group.

Optionally, that the receiving module 801 receives the group selection request specifically includes:

receiving the group selection request sent by a second network device; or receiving the group selection request that is sent by second UE used by a second MCPTT user.

Optionally, the information about the first MCPTT group is carried in a group selection message.

Optionally, the group selection message further includes an identifier of the second MCPTT user.

Optionally, the network device in this embodiment may further include a first processing module 803, configured to determine that the second MCPTT user has authority to set a selected MCPTT group for the first MCPTT user.

Optionally, the network device in this embodiment may further include a second processing module 804, configured to determine that the first MCPTT group is available.

Optionally, that the sending module 802 sends, according to the group selection request, the group selection message to the first user equipment UE used by the first MCPTT user specifically includes:

if the first MCPTT user has been associated with the first MCPTT group, the sending module 802 sends the group selection message to the first UE; or if the first MCPTT user is not associated with the first MCPTT group, the first network device associates the first MCPTT user with the first MCPTT group, and sends the group selection message to the first UE.

Optionally, the receiving module 801 is further configured to:

receive a group response message sent by the first UE, where the group response message is used to indicate that the first MCPTT user is authorized to set the first MCPTT group as a selected MCPTT group for the first MCPTT user; or receive a group selection indication message sent by the first UE, where the group selection indication message is used to indicate that the first UE successfully sets the first MCPTT group as a selected MCPTT group for the first MCPTT user.

Optionally, the network device in this embodiment may further include a third processing module 805, configured to store indication information, where the indication information is used to indicate that the first MCPTT group is a selected MCPTT group for the first MCPTT user.

The network device in this embodiment may be configured to implement the technical solutions used on the first network device side in the method embodiment shown in FIG. 1 or in the method embodiments shown in FIG. 3 to FIG. 7. An implementation principle and a technical effect of the network device are similar to those of the method embodiment, and details are not further described herein.

Figure 9:
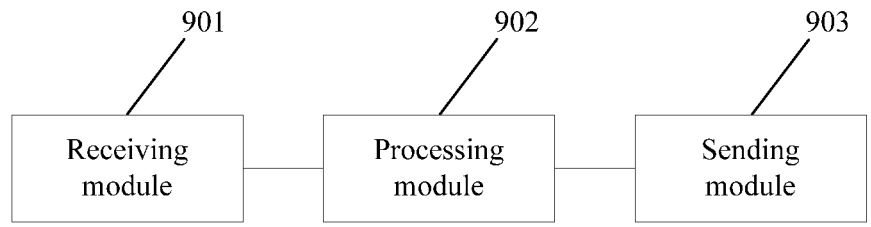
FIG. 9 is a schematic structural diagram of Embodiment 1 of user equipment according to the present invention.

FIG. 9 is a schematic structural diagram of Embodiment 1 of user equipment according to the present invention. The user equipment is first UE. As shown in FIG. 9, the user equipment in this embodiment may include a receiving module 901 and a processing module 902. The receiving module 901 is configured to receive information about a first MCPTT group that is sent by a first network device, where the information about the first MCPTT group is used to indicate a selected MCPTT group for a first MCPTT user, and the first MCPTT user uses the first UE. The processing module 902 is configured to set, according to the information about the first MCPTT group, the first MCPTT group as a selected MCPTT group for the first MCPTT user.

Optionally, the information about the first MCPTT group is carried in a group selection message.

Optionally, the group selection message further includes an identifier of the second MCPTT user.

Optionally, the processing module 902 is specifically configured to:

if the first MCPTT user is authorized to set the first MCPTT group as a selected MCPTT group for the first MCPTT user, set, by the first UE, the first MCPTT group as the selected MCPTT group for the first MCPTT user.

Optionally, the user equipment in this embodiment further includes a sending module 903, configured to:

send a group response message to the first network device, where the group response message is used to indicate that the first MCPTT user is authorized to set the first MCPTT group as a selected MCPTT group for the first MCPTT user; or send a group selection indication message to the first network device, where the group selection indication message is used to indicate that the first UE successfully sets the first MCPTT group as a selected MCPTT group for the first MCPTT user.

The user equipment in this embodiment may be configured to implement the technical solution used on the first UE side in the method embodiment shown in FIG. 2 or in the method embodiments shown in FIG. 3 to FIG. 7. An implementation principle and a technical effect of the user equipment are similar to those of the method embodiment, and details are not further described herein.

This embodiment of the present invention further provides a system, including the first network device in network device Embodiment 1 and the first UE in user equipment Embodiment 1.

The system in this embodiment may be configured to implement the technical solutions of the method embodiments shown in FIG. 3 to FIG. 7. An implementation principle and a technical effect of the system are similar to those of the method embodiment, and details are not further described herein.

Figure 10:
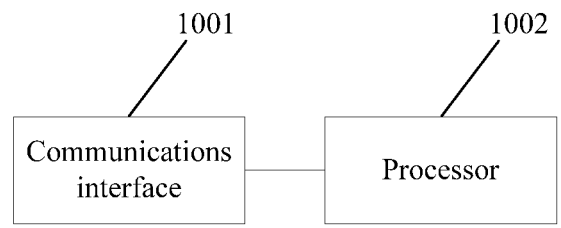
FIG. 10 is a schematic structural diagram of Embodiment 2 of a network device according to the present invention.

FIG. 10 is a schematic structural diagram of Embodiment 2 of a network device according to the present invention. The network device is a first network device. As shown in FIG. 10, the network device in this embodiment may include a communications interface 1001 and a processor 1002. The communications interface 1001 is configured to receive a group selection request, where the group selection request is used to instruct to set a first MCPTT group as a selected MCPTT group for a first MCPTT user. The processor 1002 is configured to determine information about the first MCPTT group according to the group selection request. The communications interface 1001 is further configured to send the information about the first MCPTT group to first UE used by the first MCPTT user.

Optionally, the group selection request includes first information, and the first information includes: a user identifier of the first MCPTT user and a group identifier of the first MCPTT group; or a group identifier of a second MCPTT group to which the first MCPTT user belongs and a group identifier of the first MCPTT group; or a group identifier of the first MCPTT group.

Optionally, the first information is used to instruct to set the first MCPTT group as the selected MCPTT group for the first MCPTT user.

Optionally, the information about the first MCPTT group includes a group identifier of the first MCPTT group.

Optionally, that the communications interface 1001 receives the group selection request specifically includes:

receiving the group selection request sent by a second network device; or receiving the group selection request that is sent by second UE used by a second MCPTT user.

Optionally, the information about the first MCPTT group is carried in a group selection message.

Correspondingly, that the processor 1002 determines the information about the first MCPTT group specifically includes:

generating the group selection message according to the group selection request, where the group selection message includes the information about the first MCPTT group.

Correspondingly, that the communications interface 1001 sends the information about the first MCPTT group to the first UE used by the first MCPTT user specifically includes: sending the group selection message to the first UE.

Optionally, the group selection message further includes an identifier of the second MCPTT user.

Optionally, the processor 1002 is further configured to determine that the second MCPTT user has authority to set a selected MCPTT group for the first MCPTT user.

Optionally, the processor 1002 is further configured to determine that the first MCPTT group is available.

The processor 1002 is further configured to determine whether the first MCPTT user has been associated with the first MCPTT group. If the first MCPTT user hasn't been associated with the first MCPTT group, the processor 1002 associates the first MCPTT user with the first MCPTT group.

That the communications interface 1001 sends the group selection message to the first UE specifically includes: sending the group selection message to the first UE if the processor 1002 determines that the first MCPTT user has been associated with the first MCPTT group; or sending the group selection message to the first UE after the processor 1002 associates the first MCPTT user with the first MCPTT group.

Optionally, the communications interface 1001 is further configured to:

receive a group response message sent by the first UE, where the group response message is used to indicate that the first MCPTT user is authorized to set the first MCPTT group as a selected MCPTT group for the first MCPTT user; or receive a group selection indication message sent by the first UE, where the group selection indication message is used to indicate that the first UE successfully sets the first MCPTT group as a selected MCPTT group for the first MCPTT user.

Optionally, the processor 1002 is further configured to store indication information, where the indication information is used to indicate that the first MCPTT group is a selected MCPTT group for the first MCPTT user.

The network device in this embodiment may be configured to implement the technical solutions used on the first network device side in the method embodiment shown in FIG. 1 or in the method embodiments shown in FIG. 3 to FIG. 7. An implementation principle and a technical effect of the network device are similar to those of the method embodiment, and details are not further described herein.

Figure 11:
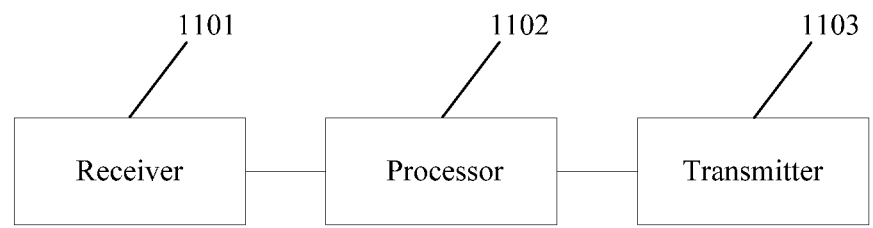
FIG. 11 is a schematic structural diagram of Embodiment 2 of user equipment according to the present invention.

FIG. 11 is a schematic structural diagram of Embodiment 2 of user equipment according to the present invention. The user equipment is first UE. As shown in FIG. 11, the user equipment in this embodiment may include a receiver 1101 and a processor 1102. The receiver 1101 is configured to receive information about a first MCPTT group that is sent by a first network device, where the information about the first MCPTT group is used to indicate a selected MCPTT group for a first MCPTT user, and the first MCPTT user uses the first UE. The processor 1102 is configured to set, according to the information about the first MCPTT group, the first MCPTT group as a selected MCPTT group for the first MCPTT user.

Optionally, the information about the first MCPTT group is carried in a group selection message.

Optionally, the group selection message further includes an identifier of the second MCPTT user.

Optionally, the processor 1102 is specifically configured to:

if the first MCPTT user is authorized to set the first MCPTT group as a selected MCPTT group for the first MCPTT user, set, by the first UE, the first MCPTT group as the selected MCPTT group for the first MCPTT user.

Optionally, the user equipment in this embodiment further includes a transmitter 1103, configured to:

send a group response message to the first network device, where the group response message is used to indicate that the first MCPTT user is authorized to set the first MCPTT group as a selected MCPTT group for the first MCPTT user; or send a group selection indication message to the first network device, where the group selection indication message is used to indicate that the first UE successfully sets the first MCPTT group as a selected MCPTT group for the first MCPTT user.

The user equipment in this embodiment may be configured to implement the technical solution used on the first UE side in the method embodiment shown in FIG. 2 or in the method embodiments shown in FIG. 3 to FIG. 7. An implementation principle and a technical effect of the user equipment are similar to those of the method embodiment, and details are not further described herein.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for setting a mission-critical push-to-talk (MCPTT) group, comprising:

receiving, by a network device from a second user equipment (UE) used by a second MCPTT user, a group selection request, the group selection request instructing setting a first MCPTT group as a selected MCPTT group for a first MCPTT user, wherein the first MCPTT user belongs to the first MCPTT group; and sending, by the network device to a first UE used by the first MCPTT user, according to the group selection request, a group selection message instructing the first UE to set the first MCPTT group as the selected MCPTT group for the first MCPTT user.

2. The method according to claim 1, wherein the group selection request comprises a user identifier of the first MCPTT user and a group identifier of the first MCPTT group.

3. The method according to claim 1, wherein the group selection message comprises a group identifier of the first MCPTT group.

4. The method according to claim 3, wherein the group selection message further comprises an identifier of the second MCPTT user.

5. The method according to claim 1, wherein sending the group selection message comprises:

determining, by the network device, that the second MCPTT user has authority to set the selected MCPTT group for the first MCPTT user.

6. The method according to claim 1, wherein sending the group selection message comprises:

determining, by the network device, whether the first MCPTT user has been associated with the first MCPTT group; and associating, based on determining that the first MCPTT user has not been associated with the first MCPTT group, by the network device, the first MCPTT user with the first MCPTT group.

7. The method according to claim 1, further comprising:

sending, by the network device to the second UE used by the second MCPTT user, a group selection response indicating whether setting the first MCPTT group as the selected MCPTT group for the first MCPTT user was successful.

8. The method according to claim 1, wherein sending the group selection message causes the first UE to notify the first MCPTT user of setting the first MCPTT group as the selected MCPTT group for the first MCPTT user.

9. The method according to claim 1, further comprising:
accessing, by the network device, a correspondence between the first MCPTT user and the first MCPTT group, wherein sending the group selection message comprises sending, by the network device to the first UE, according to the group selection request and the correspondence, the group selection message.

10. The method according to claim 1, further comprising:
receiving, by the network device, another group selection request comprising an identifier of a second MCPTT group, wherein the second MCPTT group comprises a plurality of MCPTT users; and
instructing, by the network device, according to the another group selection request, the plurality of MCPTT users to set the second MCPTT group as the selected MCPTT group.

11. A device, comprising:
at least one processor; and
a non-transitory computer-readable storage medium coupled to the at least one processor and storing programming instructions for execution by the at least one processor, the programming instructions instructing the at least one processor to:
receive, from a second user equipment (UE) used by a second MCPTT user, a group selection request, the group selection request instructing setting a first mission-critical push-to-talk (MCPTT) group as a selected MCPTT group for a first MCPTT user, wherein the first MCPTT user belongs to the first MCPTT group; and
send, to a first UE used by the first MCPTT user, according to the group selection request, a group selection message instructing the first UE to set the first MCPTT group as the selected MCPTT group for the first MCPTT user.

12. The device according to claim 11, wherein the group selection request comprises a user identifier of the first MCPTT user and a group identifier of the first MCPTT group.

13. The device according to claim 11, wherein the group selection message comprises a group identifier of the first MCPTT group.

14. The device according to claim 13, wherein the group selection message further comprises an identifier of the second MCPTT user.

15. The device according to claim 11, wherein the programming instructions further instruct the at least one processor to determine that the second MCPTT user has authority to set the selected MCPTT group for the first MCPTT user.

16. The device according to claim 11, wherein the programming instructions further instruct the at least one processor to:
determine whether the first MCPTT user has been associated with the first MCPTT group; and
associate, based on determining that the first MCPTT user has not been associated with the first MCPTT group, the first MCPTT user with the first MCPTT group.

17. The device according to claim 11, wherein the programming instructions further instruct the at least one processor to:
send, to the second UE used by the second MCPTT user, a group selection response indicating whether setting the first MCPTT group as the selected MCPTT group for the first MCPTT user was successful.

18. A device, comprising:
at least one processor; and
a non-transitory computer-readable storage medium coupled to the at least one processor and storing programming instructions for execution by the at least one processor, the programming instructions instructing the at least one processor to:
send, to a network device, a group selection request, the group selection request instructing setting a first mission-critical push-to-talk (MCPTT) group as a selected MCPTT group for a first MCPTT user, wherein the first MCPTT user belongs to the first MCPTT group, and wherein the device is used by a second MCPTT user; and
receive, from the network device, a group selection response indicating whether setting the first MCPTT group as the selected MCPTT group for the first MCPTT user was successful.

19. The device according to claim 18, wherein the group selection request comprises a user identifier of the first MCPTT user and a group identifier of the first MCPTT group.

20. The device according to claim 18, wherein the programming instructions further instruct the at least one processor to:
register a correspondence between the first MCPTT user and the first MCPTT group on a network side, when the first MCPTT user logs in to the device.

* * * * *